United States Patent Office 3,080,242
Patented Mar. 5, 1963

3,080,242
FIBROUS ALUMINUM BORATE AND
ITS PREPARATION
Kenneth Lester Berry, Hockessin, Del., assignor to E. I. du Pont de Nemours and Company, Wilmington, Del., a corporation of Delaware
No Drawing. Filed Mar. 25, 1959, Ser. No. 801,710
10 Claims. (Cl. 106—65)

This invention relates to aluminum borates. More particularly, it relates to aluminum borates having a new crystal structure and to methods for their preparation.

Aluminum borates of various chemical compositions and various crystal forms are known. However, no aluminum borate having a fibrous form has hitherto been known. In view of the refractory nature of aluminum borates, it is highly desirable to provide a fibrous crystalline form of this material which would be useful as a reinforcing agent in plastics, ceramics and the like, and which would be capable of being felted into sheets or mats that are useful as filtering media, insulation, etc.

A novel and useful form of crystalline aluminum borate is provided by this invention. The products of this invention are inorganic fibers consisting essentially of aluminum borate having the composition $(Al_2O_3)_{3n\pm0.4} \cdot B_2O_3$, where $n$ is a positive integer not greater than 2, i.e., 1 or 2, said fibers having a ratio of length to width of at least 10:1. They have a length of at least 0.7 mm. and are sufficiently flexible to be felted.

Fibrous aluminum borates of the composition $(Al_2O_3)_{3n\pm0.4} \cdot B_2O_3$, where $n$ is 1 can be prepared in accordance with the invention by dissolving alumina, $Al_2O_3$, or aluminum hydroxide, $Al(OH)_3$, in molten boric oxide, $B_2O_3$, at temperatures above 1000° C., and cooling the reaction mixture slowly to below 900° C. The aluminum borate crystallizes in the boric oxide melt in the form of fibers having lengths of at least 0.7 mm. and an axial ratio, i.e., the ratio of length to width, of at least 10:1. On further cooling, the boric oxide solidifies to a glass containing the aluminum borate fibers dispersed in it. The fibers of aluminum borate are isolated by treating the reaction mixture with water to dissolve out the unreacted boric oxide.

The proportions of aluminum oxide or aluminum hydroxide and boric oxide used in the process of this invention are not critical. Amounts of aluminum oxide ranging from 1% to 25% of the weight of the boric oxide can be employed. Since aluminum borate fibers having the best physical form are obtained from reaction mixtures containing the lower proportions of aluminum compound in the melt, it is preferred to use an amount of aluminum oxide ranging from 1% to 10% of the weight of the boric oxide. Alternatively, chemically equivalent amounts of aluminum hydroxide based on the aluminum may be substituted for the aluminum oxide.

As indicated above, the reaction with the boric oxide takes place at temperatures above 1000° C. Preferably temperatures between 1000° and 1600° C. are used. The particular temperature employed in any given case is dependent on the particular concentration of aluminum compound dissolved in the molten boric oxide. At 1000° C. about 1% aluminum oxide is dissolved in boric oxide while at higher temperatures higher proportions of aluminum oxide are soluble.

It is generally preferred to heat the reactant mixture at the reaction temperature of 1000–1600° C. for a long enough time to get the aluminum oxide in solution. The reaction of the aluminum oxide with boric oxide to form aluminum borate takes place within a few minutes at these temperatures and the fibers of aluminum borate begin to crystallize in the melt in a few minutes. However, the reaction mixture can be heated for times ranging up to several hours, e.g., 6–10 hours, if desired. Excessively long heating periods at a high temperature will cause a loss of boric oxide from the aluminum borate with the formation of fibrous aluminum borates of a second type which are defined below. While it is preferred to heat the reaction mixture until all the aluminum oxide is in solution, complete solution of the aluminum oxide is not essential for the formation of aluminum borate fibers of the type defined above. If a large amount of aluminum oxide is used and it is not completely dissolved in the molten boric oxide, the excess aluminum oxide remains as a solid mass which can be separated from the fibrous aluminum borate after the excess boric oxide is removed by dissolving in water.

Cooling of the reaction product in the molten boric oxide is preferably carried out at as slow a rate as practical until a temperature below 900° C. is reached in order to obtain aluminum borate crystals having the best fibrous form. If the molten reaction mixture is quenched, i.e., cooled rapidly below 900° C., no crystals of aluminum borate are formed, only a solid, clear or milky glass is obtained. It is convenient to cool the reaction mixture from the reaction temperature down to at least 900° C. at a rate of about 25° C. per hour until the aluminum borate is completely crystallized. The completeness of crystallization is readily determined by taking a small portion of the melt and adding it to an excess of water. After the crystallization is completed, there will be only aluminum borate fibers dispersed in the water. If the crystallization is not complete, there will also be a flocculent gelatinous precipitate. If such a precipitate is observed, the slow cooling is continued until further tests show no flocculent precipitate.

After crystallization is completed, the reaction mixture is cooled to ordinary temperatures and excess boric oxide is removed by washing with water. Either cold or hot water can be used for this purpose but it is preferred to use boiling water since the boric oxide is more soluble in it.

The fibrous aluminum borates having the composition $(Al_2O_3)_{3\pm0.4} \cdot B_2O_3$ have a characteristic X-ray diffraction pattern. The diffraction pattern shown by this particular type of aluminum borate (type A) comprises a line of strong intensity at 5.30 A. and lines of medium intensity at 4.95, 4.35, 3.35, 2.66, 2.47, 2.22, 2.14, 1.50, and 1.39 A.

The fibrous aluminum borates of the type described above can also be prepared by heating aluminum oxide or aluminum hydroxide with boric oxide in the presence of supercritical water. In this process, a mixture of approximately 75 to 25 mole percent of aluminum oxide or chemically equivalent amounts of aluminum hydroxide based on the aluminum and 25 to 75 mole percent of boric oxide is heated in the presence of water, e.g., an amount of water ranging from 50% to 200% or more of the weight of the solid ingredients, at a temperature of 500° or higher, e.g., 500–750° C., under superatmospheric pressure, e.g., pressures up to 5000 atmospheres (or higher if suitable equipment is available). Heating of the reaction mixture under these conditions is continued for a period of 1–24 hours depending on the operating conditions being employed. At 750° C. and 3000 atmospheres pressure a reaction time of 3 hours is satisfactory. Longer reaction times are usually employed when the lower operating temperatures are used. When higher operating temperatures are used, shorter reaction periods are employed.

When the aluminum borate fibers of the type described above, i.e., type A, are heated under conditions that cause removal of boric oxide, another crystalline phase of aluminum borate fiber (type B) is formed. This new type of aluminum borate fiber has the composition $(Al_2O_3)_{9\pm0.4} \cdot B_2O_3$ 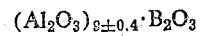

and exhibits a different and characteristic X-ray diffraction pattern. The X-ray diffraction pattern shown by type B aluminum borate includes two lines of strong intensity at 5.37 and 4.35 A., and many lines of lesser intensity, particularly at 3.85, 3.75, 3.37, 3.12, 2.84, 2.69, 2.51, 2.43, 2.27, 2.18, and 2.11 A. The type B product still has the same fibrous form and the fibers are sufficiently flexible to be felted. If the heat treatment is continued beyond the point where the second type of fibrous aluminum borate is produced, more boric oxide is driven off and the ultimate product is corundum, $\alpha$-$Al_2O_3$.

One method of forming the second type (type B) of aluminum borate fibers comprises heating the first type of aluminum borate (type A), prepared as described previously, under conditions causing vaporization of boric oxide. For example, fibers of type A aluminum borate are converted to type B fibers by heating at 1750° C. under atmospheric pressure for a period of about 5 minutes. At a temperature of about 1400° C. and 0.1 mm. mercury pressure, type B fibers are obtained in several hours. Heating temperatures of as low as 600° C. can be employed with correspondingly long heating periods.

Water as vapor or liquid in contact with the aluminum borate accelerates removal of boric oxide. Thus, another method for converting the type A fibrous aluminum borate to fibers of type B comprises heating of type A fibers in the presence of water to extract the boric oxide from the aluminum borate crystals. In this embodiment the conversion can be accomplished by heating the type A aluminum borate fibers with about five times their weight of water at 750° C. under about 1500 atmospheres pressure for a few hours, e.g., 2–5 hours. As in the previous embodiment, the aluminum borate fibers retain their physical form but they exhibit the type B X-ray diffraction pattern that is characteristic of the type B fibers obtained by heating type A fibers with volatilization of boric oxide.

The aluminum oxide, aluminum hydroxide, and boric oxide used in the process of this invention can be of the ordinary grades of these materials that are available commercially.

The X-ray diffraction patterns referred to in this application are the powder diffraction reflections obtained with filtered Cu—K radiation. In the tables listing the specific diffraction lines, the columns headed "d" give the spacings of the specific lines in the pattern in A. units; and the columns headed "I" give the arbitrary visually estimated values of the intensities of the specific lines listed under "d." The intensity symbols have the following meanings:

S=strong
$M_1$–$M_4$=medium, with $M_4$ being the weakest of the M ratings
F=faint The X-ray diffraction patterns given above clearly distinguish the two types of crystalline materials produced although the absolute values listed may vary within small ranges.

The products and process of this invention are illustrated in further detail in the following examples.

EXAMPLE I

A. Preparation of Fibrous Aluminum Borate Having X-Ray Diffraction Pattern of Type A A platinum crucible is charged with 2 g. of boric oxide and 0.5 g. of aluminum hydroxide and heated at approximately 1400° C. for about 10 minutes whereupon a clear melt is obtained. This melt is then cooled at a rate of about 10°/min. through the range 1400–900° C. and a colorless acicular crystalline phase is formed in molten boric oxide. Subsequently, upon rapid cooling to room temperature, the excess boric oxide solidifies to a glass containing fibrous crystals. The frozen melt is digested in 100 ml. of 2% aqueous sodium hydroxide solution. Aggregates of poorly developed crystals on the walls of the platinum crucible are discarded and the suspension of colorless fibers of good form is filtered, washed with water, and dried. There is obtained 0.25 g. of fibers containing by analysis, 43.5% aluminum and 5.9% boron. These analytical data indicate the composition of the fibers to be $(Al_2O_3)_{3.0} \cdot B_2O_3$. The X-ray diffraction pattern obtained for these fibers is that designated as type A. The significant lines in this diffraction pattern are as follows:

TABLE I.—X-RAY DIFFRACTION LINES

| d | I | d | I | d | I | d | I | d | I |
|---|---|---|---|---|---|---|---|---|---|
| 7.49 | F | 2.966 | F | 2.10 | $M_4$ | 1.566 | F | 1.31 | F |
| 6.65 | F | 2.785 | F | 1.99 | F | 1.54 | F | 1.29 | F |
| 5.30 | S | 2.66 | $M_1$ | 1.97 | F | 1.50 | $M_4$ | 1.24 | F |
| 4.92 | $M_3$ | 2.63 | F | 1.92 | F | 1.48 | F | 1.23 | F |
| 4.35 | $M_4$ | 2.47 | $M_2$ | 1.83 | F | 1.45 | F | 1.20 | F |
| 3.75 | F | 2.396 | F | 1.795 | F | 1.43 | F | 1.16 | F |
| 3.59 | F | 2.34 | F | 1.726 | F | 1.39 | $M_4$ | 1.10 | F |
| 3.35 | $M_1$ | 2.22 | $M_4$ | 1.67 | F | 1.35 | F | .995 | F |
| 3.10 | F | 2.14 | $M_1$ | 1.65 | F | 1.33 | F | .983 | F |

Most of these fibers are 0.7 to 1.1 mm. long and have a range of cross-sectional dimensions of about 1 to 10 microns. The wider fibers appear to be lath shape and have thicknesses less than 5 microns. Thus, although there are some fragments of the thickest fibers, most of this product has a minimum axial ratio of 70 and ranges to about 1000.

B. Conversion of Aluminum Borate Fibers of Type A to Type B

A portion of the fibrous aluminum borate described in the preceding paragraph is placed in a platinum crucible and heated at approximately 1750° C. for 5 minutes. During this heating there is a loss of some boric oxide but there is no change in the appearance of the fibers. However, the X-ray diffraction pattern exhibited by these heated fibers differs from the pattern exhibited by the starting material and is identified as type B. The significant X-ray diffraction lines of this type B pattern are as follows:

TABLE II.—X-RAY DIFFRACTION LINES

| d | I | d | I | d | I | d | I |
|---|---|---|---|---|---|---|---|
| 5.37 | S | 2.31 | F | 1.685 | $M_2$ | 1.25 | $M_3$ |
| 5.01 | F | 2.27 | S | 1.59 | $M_3$ | 1.186 | $M_2$ |
| 4.35 | S | 2.18 | $M_1$ | 1.48 | F | 1.115 | F |
| 3.85 | $M_3$ | 2.115 | $M_1$ | 1.47 | F | 1.102 | $M_3$ |
| 3.75 | $M_2$ | 1.97 | $M_3$ | 1.45 | $M_3$ | 1.035 | F |
| 3.37 | S | 1.93 | F | 1.42 | $M_3$ | 1.004 | F |
| 3.12 | $M_3$ | 1.87 | $M_3$ | 1.39 | $M_3$ | .962 | F |
| 2.84 | $M_3$ | 1.84 | $M_2$ | 1.36 | F | .950 | F |
| 2.69 | S | 1.83 | $M_2$ | 1.34 | F | .931 | $M_4$ |
| 2.51 | $M_1$ | 1.78 | F | 1.33 | $M_2$ | .911 | $M_2$ |
| 2.43 | $M_4$ | 1.71 | $M_3$ | 1.31 | $M_3$ | .902 | $M_2$ |

The X-ray diffraction pattern also contains some of the lines shown by corundum.

EXAMPLE II

A. Preparation of Fibrous Aluminum Borate of Type A

A platinum dish is charged with 20 g. of boric oxide and is heated for about 0.5 hour at a temperature above 1500° C. Upon cooling, a transparent cake of boric oxide glass, amounting to 17.4 g., is obtained. One gram of ignited aluminum oxide powder is placed in a mound in the center of the surface of the boric oxide cake and the latter is heated to a temperature about 1550° C. The aluminum oxide very slowly wets and sinks through the melt to the bottom of the container. A growth of crystals occurs non-uniformly in cloudy patches outward from the aluminum oxide. After 4.5 hours of heating, the melt is allowed to cool spontaneously and the crystal growth is observed microscopically. The crystals are found to contain long fibers radiating from the aluminum oxide into the boric oxide glass.

Heating of the mixture is resumed an additional 3.5 hours at 1550° C. and at the end of this time the fiber growth fills the melt. After cooling until it solidifies, the melt is digested in boiling water to dissolve the boric oxide matrix and to disperse the crystalline product. The crystalline fibers are filtered, washed with water and dried, and there is obtained 1.25 g. of colorless, clear glass-like fibers varying in length and width. The widths of the fibers range from less than 1 to more than 25 microns with the major proportion being about 5–10 microns and with lengths ranging from 1 mm. to about 5 mm. with the major proportion being 1–3 mm. The average ratio of length to width of these fibers is about 400. The X-ray diffraction pattern of these fibers contains the following lines:

TABLE III.—X-RAY DIFFRACTION LINES

| d | I | d | I | d | I | d | I |
|---|---|---|---|---|---|---|---|
| 5.30 | S | 2.65 | $M_2$ | 1.91 | F | 1.49 | F |
| 4.95 | $M_3$ | 2.45 | $M_4$ | 1.79 | F | 1.43 | F |
| 4.35 | $M_1$ | 2.21 | F | 1.67 | F | 1.39 | F |
| 3.77 | F | 2.18 | F | 1.55 | F | 1.33 | F |
| 3.56 | F | 2.13 | $M_3$ | 1.51 | F | 1.30 | F |
| 3.34 | $M_1$ | 2.07 | F | | | | |

On analysis, the aluminum borate fibers are found to contain 42.4% aluminum and 5.9% boron, which corresponds to the composition $(Al_2O_3)_{2.9} \cdot B_2O_3$.

B. *Conversion of Aluminum Borate Fibers of Type A to Type B by Means of Supercritical Water*

A mixture of 0.102 g. of the fibrous aluminum borate of type A described in the preceding paragraph and 0.508 g. of water is placed in a platinum capsule which is crimped and welded shut. The capsule is placed in a pressure vessel capable of withstanding high temperatures and high pressures and the entire vessel is heated at 746–768° C. for 3 hours under 1450–1490 atmospheres pressure. At the end of this time, the reaction vessel is slowly cooled (through 175° during first 1.5 hours and 75° during next hour) to room temperature and is then opened. The reaction mixture comprises fibrous crystals, identical in appearance with the starting material, suspended in an aqueous solution of boric acid. After washing and drying, the crystals are found to give a moderately strong, sharp X-ray diffraction pattern of type B. The characteristic diffraction lines in this pattern are as follows:

TABLE IV.—X-RAY DIFFRACTION LINES

| d | I | d | I | d | I | d | I |
|---|---|---|---|---|---|---|---|
| 7.49 | $M_4$ | 2.26 | $M_3$ | 1.589 | $M_4$ | 1.306 | $M_3$ |
| 5.34 | S | 2.18 | $M_2$ | 1.562 | $M_4$ | 1.296 | $M_4$ |
| 4.98 | F | 2.11 | $M_3$ | 1.529 | F | 1.283 | $M_4$ |
| 4.35 | S | 2.09 | F | 1.511 | $M_2$ | 1.271 | $M_4$ |
| 3.83 | $M_4$ | 2.00 | F | 1.476 | $M_4$ | 1.253 | $M_3$ |
| 3.74 | $M_3$ | 1.95 | $M_4$ | 1.462 | $M_4$ | 1.233 | $M_4$ |
| 3.36 | $M_1$ | 1.92 | F | 1.448 | $M_4$ | 1.224 | $M_4$ |
| 3.11 | $M_4$ | 1.87 | $M_4$ | 1.414 | $M_3$ | 1.212 | $M_4$ |
| 2.83 | $M_3$ | 1.84 | $M_3$ | 1.396 | $M_4$ | 1.187 | $M_4$ |
| 2.68 | $M_2$ | 1.82 | $M_3$ | 1.370 | $M_4$ | 1.175 | $M_4$ |
| 2.51 | $M_2$ | 1.78 | $M_4$ | 1.356 | $M_4$ | 1.153 | $M_4$ |
| 2.42 | $M_4$ | 1.71 | $M_4$ | 1.338 | $M_4$ | 1.141 | $M_4$ |
| 2.30 | $M_4$ | 1.685 | $M_3$ | 1.330 | $M_3$ | | |

C. *Conversion of Aluminum Borate of Type A to Type B by Heating Under Reduced Pressure*

The product of Example II–A is dried overnight over phosphorus pentoxide and 0.471 g. of it is heated for 4.5 hours at 1420° C. under 0.01 mm. mercury pressure. At the end of this time, the weight of the product is reduced to 0.411 g. This is heated for an additional 4.5 hours at 1410° C. under 0.01 mm. mercury pressure, at which time its weight is reduced to 0.403 g. A total of 0.068 g. of boric oxide has been volatilized from the original sample. The product has the same crystal form as the starting material but it now exhibits the type B X-ray diffraction pattern. The product contains 49.0% aluminum, and this indicates the product has the composition $(Al_2O_3)_{8.6} \cdot B_2O_3$. The X-ray diffraction pattern obtained for this product is the same as that given in Table IV.

EXAMPLE III

A mixture of 52 g. of pre-fused boric oxide and 1 g. of ignited aluminum oxide is heated by flame in a platinum dish at temperatures above 1500° C. The melt is heated and stirred with a platinum stirrer until all of the aluminum oxide is dissolved and a ring of fibrous crystals tends to form around the cooler surface perimeter of the melt. This requires about one hour. The melt is cooled slowly over a period of 0.5 hour without stirring while crystallization of a solid phase occurs in the melt. It is then allowed to solidify. The glassy cake obtained is broken and cross-sections are examined. In the outer edge of the surface of the melt there is a dense mass of tangled fibrous crystals from which fibers emanate toward the center bottom of the melt. Individual fibers are 3 mm. or more in length and have cross-sectional dimensions of less than 10 microns. The average axial ratio of these fibers is about 400. A portion of the reaction mixture, 40.5 g., is extracted with hot water to dissolve the boric oxide matrix and the resulting suspension of fibrous crystals is filtered. These fibrous crystals of aluminum borate collect on the filter in the form of a stiff, coherent felted mat. The fibers contain 43.73% aluminum and 5.74% boron, on analysis. These analyses correspond to an aluminum borate of the composition $(Al_2O_3)_{3.1} \cdot B_2O_3$.

EXAMPLE IV

A mixture of 0.079 g. of aluminum hydroxide, 0.299 g. of boric oxide and 0.248 g. of water is placed in a platinum capsule which is crimped and welded shut. The capsule is placed in a pressure vessel and heated for 3 hours at 746–768° C. under 1450–1490 atmospheres pressure. After cooling to room temperature during a period of more than 10 hours, the reaction mixture is removed from the platinum capsule, and there is obtained short fibrous crystals having a wide range of cross-sectional dimensions including very fine fibers less than 1 micron thick. The X-ray diffraction pattern obtained on these fibers of aluminum borate contain the lines of type A. The characteristic lines are given below.

TABLE V.—X-RAY DIFFRACTION LINES

| d | I | d | I | d | I | d | I | d | I |
|---|---|---|---|---|---|---|---|---|---|
| 7.56 | F | 3.35 | $M_3$ | 2.225 | F | 1.82 | F | 1.48 | F |
| 6.75 | $M_4$ | 2.966 | F | 2.14 | $M_2$ | 1.79 | F | 1.43 | F |
| 5.30 | S | 2.785 | F | 2.09 | F | 1.67 | F | 1.39 | $M_4$ |
| 4.95 | $M_1$ | 2.66 | $M_2$ | 2.06 | F | 1.646 | F | 1.34 | F |
| 4.33 | F | 2.62 | F | 1.98 | F | 1.56 | F | 1.30 | F |
| 3.80 | F | 2.466 | $M_2$ | 1.955 | F | 1.535 | F | 1.225 | F |
| 3.60 | $M_4$ | 2.35 | F | 1.916 | F | 1.495 | F | | |

EXAMPLE V

A mixture of 95 g. of pre-fused boric oxide and 5 g. of ignited aluminum oxide is placed in a platinum tube 1″ in diameter by 11″ long which is inserted in an inclined ceramic tube in a furnace. The latter is heated to 1450° C. and held overnight at this temperature. A drop of melt is removed on a platinum spatula, chilled and dissolved in hot water giving a flocculent gel in suspension. The tube assembly is withdrawn from the furnace at a rate of 0.5″/hr. in the direction of the open, upper end of the reaction vessel. After 3 hours the center of the surface of the melt is at a temperature of 1320° and fibrous crystals are growing in the extreme outer edge of the melt at a temperature of 1250° by optical pyrometer reading. The temperature at the center of the furnace is maintained at 1450° by thermocouple reading. Withdrawal of the melt at the same rate is maintained and crystal growth proceeds steadily and progresses inward through the melt from its surface. After 5.5 hours of such withdrawal, it is discontinued and the power to the furnace is shut off causing a temperature drop of 300° in the first 15 minutes. Cooling to room temperature proceeds overnight. The product weighs 96.2 g. and comprises boric oxide glass filled with fibrous crystals. The solid in the tube is treated with successive portions of hot water to remove successive layers of the reaction product and the extracts are collected in six fractions each of which is separately filtered and the fibrous phase collected on a filter, washed with hot water, dried and weighed. The first three of these are of approximately equal size, about 0.25 g., and are coherent, tough, paper-like felted structures composed of fibrous crystals 1–5 microns in diameter with the average about 2 microns and up to about 1 mm. long. The fourth and fifth fractions weigh 1.32 and 1.87 g., respectively, and are obtained as coherent, felted, paper-like structures. In these, there is a trend toward more of the thickest, albeit longer crystals having a tendency to be fractured presumably as a result of thermal stresses induced during cooling of the boric oxide glass matrix. Evidently the coarser crystals result in regions of the melt having the highest concentration of product and which are cooled at the fastest rate. The sixth fraction is a 1.91 g. heel of relatively coarse crystals affording an X-ray diffraction pattern revealing largely type B aluminum borate (the diffraction lines are the same as those listed in Table IV) along with alumina. The first fraction gives a type A diffraction pattern (the diffraction lines are the same as those listed in Table I). Fraction 4 contains by analysis 43.65% Al and 6.16% B, corresponding to the composition $(Al_2O_3)_{2.8} \cdot B_2O_3$.

As indicated previously, the aluminum borate fibers of this invention are sufficiently flexible to be feltable. This permits the shaping of these aluminum borate fibers into sheets or mats of felted fibers which are useful for various purposes. These felted mats of aluminum borate fibers are useful for thermal insulation and as filter media for molten salts and the like. These aluminum borate fibers are also useful as reinforcing agents in plastics, ceramics and metals. They are also useful as chemical intermediates to other aluminum compounds, e.g., corundum.

What is claimed is:

1. An inorganic fiber consisting essentially of aluminum borate having the composition $(Al_2O_3)_{3n \pm 0.4} \cdot B_2O_3$ where $n$ is a positive integer not greater than 2, said fiber having a ratio of length to width of at least 10 to 1 wherein said width is no greater than 25 microns and having sufficient flexibility to be felted.

2. An inorganic fiber consisting essentially of aluminum borate having the composition $(Al_2O_3)_{3n \pm 0.4} \cdot B_2O_3$ where $n$ is 1, said fiber having a ratio of length to width of at least 10 to 1 wherein said width is no greater than 25 microns and having sufficient flexibility to be felted.

3. An inorganic fiber consisting essentially of aluminum borate having the composition $(Al_2O_3)_{3n \pm 0.4} \cdot B_2O_3$ where $n$ is 2, said fiber having a ratio of length to width of at least 10 to 1 wherein said width is no greater than 25 microns and having sufficient flexibility to be felted.

4. A method for producing a fiber which comprises reacting a mixture of boric oxide with a member of the group consisting of aluminum oxide and aluminum hydroxide, wherein the amount of aluminum oxide used ranges from 1 to 25% of the weight of the boric oxide and the amount of aluminum hydroxide used is an amount chemically equivalent to the aluminum oxide based on aluminum, at a temperature between about 1000 and about 1600° C. and cooling the reaction mixture slowly to a temperature below 900° C.

5. The process of claim 4 wherein the cooled reaction mixture is washed with water to remove excess boric oxide.

6. A method for producing a fiber which comprises reacting a mixture of boric oxide and a member of the group consisting of aluminum oxide and aluminum hydroxide wherein the proportions of the reactants is about 75 to 25 mole percent aluminum oxide and 25 to 75 mole percent of boric oxide, and the amount of aluminum hydroxide used is an amount chemically equivalent to the aluminum oxide based on aluminum in the presence of supercritical water.

7. A method for producing a fiber which comprises heating for a time sufficient to produce the fiber, a mixture of about 75 to 25 mole percent aluminum oxide with about 25 to 75 mole percent of boric oxide in the presence of an amount of water equal to at least 50% of the weight of the solid ingredients at a temperature of at least 500° C. and at a pressure such that the water remains in liquid form.

8. A method for producing a fiber of the formula $(Al_2O_3)_{9 \pm 0.4} \cdot B_2O_3$ which comprises heating an inorganic fiber consisting essentially of aluminum borate having the composition $(Al_2O_3)_{3 \pm 0.4} \cdot B_2O_3$, said fiber having a ratio of length to width of at least 10:1 wherein said width is no greater than 25 microns, and having sufficient flexibility to be felted, under conditions causing removal of boric oxide.

9. A method for producing a fiber of the formula $(Al_2O_3)_{9 \pm 0.4} \cdot B_2O_3$ which comprises heating an inorganic fiber consisting essentially of aluminum borate having the composition $(Al_2O_3)_{3 \pm 0.4} \cdot B_2O_3$, said fiber having a ratio of length to width of at least 10:1 wherein said width is no greater than 25 microns, and having sufficient flexibility to be felted, under conditions causing vaporization of boric oxide.

10. A method for producing a fiber of the formula $(Al_2O_3)_{9 \pm 0.4} \cdot B_2O_3$ which comprises heating an inorganic fiber consisting essentially of aluminum borate having the composition $(Al_2O_3)_{3 \pm 0.4} \cdot B_2O_3$, said fiber having a ratio of length to width of at least 10:1 wherein said width is no greater than 25 microns, and having sufficient flexibility to be felted, in the presence of supercritical water and removing the aqueous solution of boric acid formed.

References Cited in the file of this patent

UNITED STATES PATENTS 2,118,143 Benner et al. _____ May 24, 1938

OTHER REFERENCES

Scholze: Zeitschrifte für Anorganische und Allgemeine Chemie, Band 284 (1956), pages 272–277.

Hoffman: Lexicon der Anorganischen Verbindungen, Band II (1941), pages 3 and 4.